United States Patent
Keith et al.

(10) Patent No.: US 11,566,576 B2
(45) Date of Patent: Jan. 31, 2023

(54) INTERNAL COMBUSTION ENGINE AND METHOD FOR OPERATING AN INTERNAL COMBUSTION ENGINE

(71) Applicant: INNIO Jenbacher GmbH & Co OG, Jenbach (AT)

(72) Inventors: Douglas Keith, Hampshire (GB); Josef Thalhauser, Nußdorf (DE); Nikolaus Spyra, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 17/436,064

(22) PCT Filed: Mar. 4, 2019

(86) PCT No.: PCT/AT2019/060070
§ 371 (c)(1),
(2) Date: Sep. 2, 2021

(87) PCT Pub. No.: WO2020/176911
PCT Pub. Date: Sep. 10, 2020

(65) Prior Publication Data
US 2022/0178323 A1 Jun. 9, 2022

(51) Int. Cl.
*F02D 41/14* (2006.01)
*F02B 37/16* (2006.01)
(Continued)

(52) U.S. Cl.
CPC ....... *F02D 41/1448* (2013.01); *F01N 3/2892* (2013.01); *F02B 37/16* (2013.01);
(Continued)

(58) Field of Classification Search
CPC ............. F02D 41/1448; F02D 13/0234; F02D 41/0007; F02D 41/146; F02D 41/401;
(Continued)

(56) References Cited

U.S. PATENT DOCUMENTS

| 4,867,127 A | 9/1989 | Quirchmayr et al. |
| 10,077,729 B2 | 9/2018 | Huber et al. |
| (Continued) |

FOREIGN PATENT DOCUMENTS

| EP | 0259382 A1 | 3/1988 |
| EP | 2977596 A1 | 1/2016 |
| WO | 2017000012 A1 | 1/2017 |

OTHER PUBLICATIONS

PCT International Search Report and Written Opinion; Application No. PCT/AT2019/060070; dated Oct. 24, 2019; 14 pages.

*Primary Examiner* — Audrey B. Walter
(74) *Attorney, Agent, or Firm* — Fletcher Yoder, P.C.

(57) ABSTRACT

An internal combustion engine with an open-loop or closed-loop control device (2), wherein at least one combustion chamber (3) of the internal combustion engine (1) is designed to burn a fuel-air mixture using at least one combustion parameters that can be influenced by the open-loop or closed-loop control device (2), wherein the open-loop or closed-loop control device (2) has an emission control loop that is configured to actuate the at least one actuator that influences the at least one combustion parameter as a substitute parameter for NOx emissions by means of a functional relationship in such way that at last one combustion parameter can be set for each target or actual power rating of the internal combustion engine (1), wherein the functional relationship takes account of an influence of a change of the exhaust backpressure ($p_3'$) affecting at least one combustion chamber (3).

20 Claims, 5 Drawing Sheets

(51) Int. Cl.
    *F01N 3/28*           (2006.01)
    *F02B 37/18*         (2006.01)
    *F02D 13/02*         (2006.01)
    *F02D 41/00*         (2006.01)
    *F02D 41/40*         (2006.01)
    *F02P 5/15*           (2006.01)
    *F02B 37/22*         (2006.01)
    *F02D 41/38*         (2006.01)

(52) U.S. Cl.
    CPC ............ *F02B 37/162* (2019.05); *F02B 37/18* (2013.01); *F02B 37/183* (2013.01); *F02B 37/22* (2013.01); *F02D 13/0234* (2013.01); *F02D 41/0007* (2013.01); *F02D 41/146* (2013.01); *F02D 41/401* (2013.01); *F02P 5/1502* (2013.01); *F02D 2041/389* (2013.01)

(58) Field of Classification Search
    CPC .. F02D 2041/389; F01N 3/2892; F02B 37/16; F02B 37/162; F02B 37/18; F02B 37/183; F02B 37/22; F02P 5/1502
    See application file for complete search history.

(56) References Cited

U.S. PATENT DOCUMENTS

| | | | |
|---|---|---|---|
| 2003/0127079 A1 | 7/2003 | Onodera et al. | |
| 2006/0288701 A1 | 12/2006 | Ramamurthy et al. | |
| 2014/0174073 A1 | 6/2014 | Karnik et al. | |
| 2015/0233312 A1* | 8/2015 | Kopecek | F02D 41/32 123/435 |
| 2018/0135541 A1 | 5/2018 | Hsieh et al. | |
| 2018/0355805 A1* | 12/2018 | Thalhauser | F02D 41/0007 |

\* cited by examiner

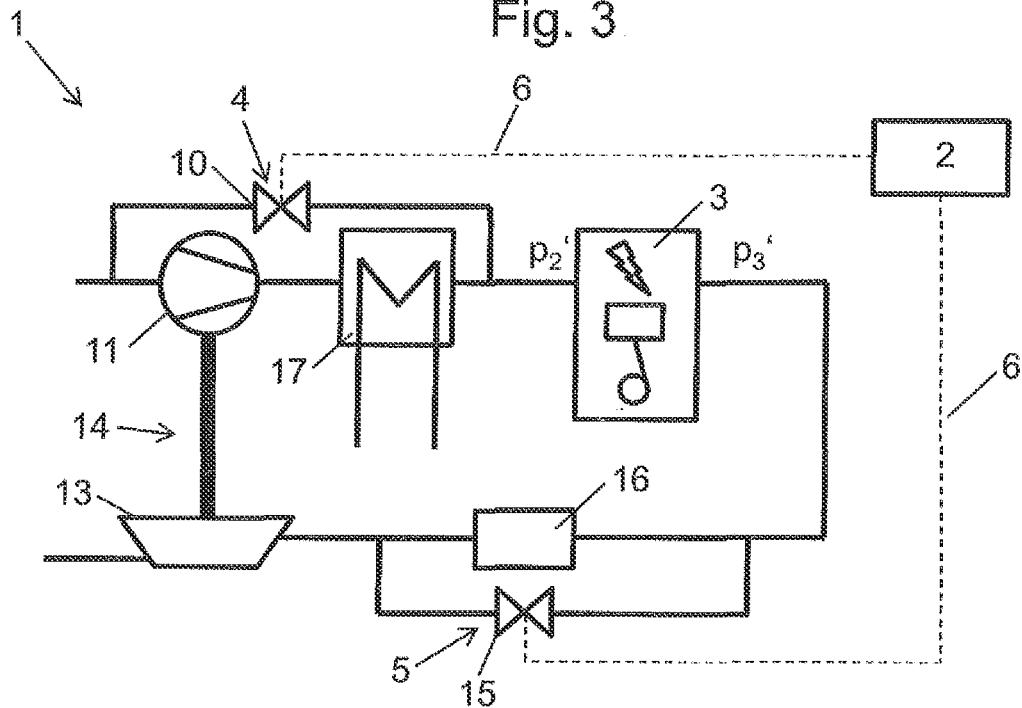
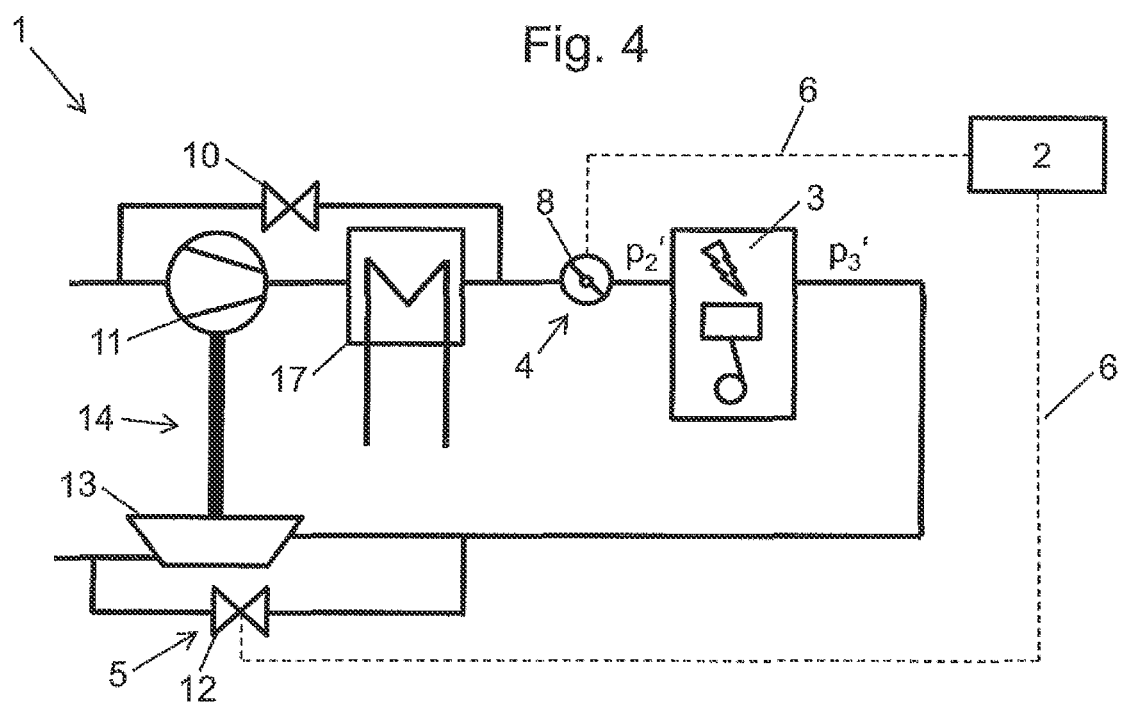

INTERNAL COMBUSTION ENGINE AND METHOD FOR OPERATING AN INTERNAL COMBUSTION ENGINE

CROSS-REFERENCE TO RELATED APPLICATION

This application is a National Stage entry from, and claims benefit of, PCT Application No. PCT/AT2019/060070, filed on Mar. 4, 2019; entitled "INTERNAL COMBUSTION ENGINE AND METHOD FOR OPERATING AN INTERNAL COMBUSTION ENGINE", which is herein incorporated by reference in its entirety.

BACKGROUND

This invention relates to an internal combustion engine and a process for the closed-loop or open-loop control of an internal combustion engine.

A closed-loop control strategy for an internal combustion engine is known from EP 0259382 B1 where, as a function of a measured actual power rating for an internal combustion engine, a target value for charge pressure can be established. By means of a first control loop (charge pressure controller), and with a target-actual variance check, the actual value for charge pressure can be adjusted to match the target value for charge pressure. This target value for charge pressure is connected to a defined target value for $NO_x$ emissions. Since the $NO_x$ emission level is not known directly, the charge pressure is used as an auxiliary control parameter. The functional relationship takes the form of a set of curves in which each curve in relation to a given $NO_x$ value indicates the relationship between actual power and the target value for charge pressure. To this extent, the charge pressure controller is really an emission control loop in relation to the $NO_x$ emissions ($NO_x$ emission control loop).

The Lambda value is set in response to a gas dispensing unit. A change to the Lambda value would have an impact on the performance rating of the internal combustion engine, which then needs to be balanced out by a second control loop (power control loop). This balancing of the power control loop is performed by the actuators that directly influence the charge pressure (for example, by the throttle valve, a wastegate, a variable turbine geometry, a compressor bypass line, a variable valve drive or similar). Therefore, charge pressure is controlled directly by the combustion air ratio (Lambda value). This control strategy is known as LEANOX controller.

Accordingly, therefore the functional relationship between the charge pressure prevailing upstream of the engine intake valves that is relatively easy to measure and the engine power is used to control the $NO_x$ emission level.

In that respect, the charge pressure measuring output is connected to an actual input on the first control loop. In the first control loop on EP 0259382 B1 (charge pressure controller), a programmable unit is arranged for determining a power-dependent target value for the charge pressure from the power measuring signal output, which is delivered by the power measuring device.

In that respect, closed-loop control of the charge pressure takes place indirectly using the closed-loop control of the combustion air ratio (Lambda value) in the air-gas mixer in which, for example, making the mixture more lean (increasing the Lambda value) causes an increase in charge pressure upstream of the intake valves (when requesting constant engine power).

The above describes the cascaded form of the LEANOX controller. It is also possible to perform both closed-loop control interventions concurrently (see EP 2977596 B1 for details). This invention can be used for both forms of the LEANOX controller An alternative involves using cylinder pressure instead of charge pressure as a closed-loop control parameter. By way of example, this is described in EP 2910755 B1. The invention can also be used on a closed-loop control system of this kind.

Further known embodiments from the state of the art are disclosed by the documents US 2018/135541 A1, US 2003/127079 A1, US 2006/288701 A1 or US 2014/174073 A1.

Difficulties are that the closed-loop control system for controlling emissions known from the prior art does not take account of the influence of exhaust backpressure, which can yield unfavorable emission characteristics.

If, for example, a bypass valve for an exhaust turbine of a turbocharger (also known as a wastegate) is closed in an exhaust pipe, exhaust backpressure rises in the combustion chamber, which causes an increase in $NO_x$ emissions.

The familiar closed-loop control strategies, therefore, do not recognise any change in $NO_x$ emissions caused by a change in exhaust backpressure. Consequently, $NO_x$ emissions increase, which has an adverse impact on the emission target values to be achieved, and, of course, on the long-term observation of the $NO_x$ emissions of an internal combustion engine.

BRIEF DESCRIPTION

The aim of this invention is to provide an internal combustion engine and a process for operating an internal combustion engine with a—compared to the prior art—technically improved open-loop or closed-loop control device or strategy capable of avoiding undesirable increases in $NO_x$ emissions in response to a change in exhaust backpressure.

This task is resolved by an internal combustion engine with an open-loop or closed-loop control device as described and claimed herein.

This is accomplished by the open-loop or closed-loop control unit having an emission control loop that is configured to actuate the at least one actuator that influences the at least one combustion parameter as a substitute parameter for NOx emissions by means of a functional relationship in such way that at least one combustion parameter can be set for each target power or actual power rating of the internal combustion engine, wherein the functional relationship defines the charge pressure based on the desired value for the power, the $NO_x$ emissions and a given level of exhaust backpressure and is saved in the open-loop or closed-loop control unit, wherein the functional relationship takes account of an influence of a change of the exhaust backpressure acting on the at least one combustion chamber.

So, as the functional relationship takes account of the influence of a change in the exhaust backpressure acting on the at least one combustion chamber, when performing open-loop or closed-loop control of the internal combustion engine, the most favorable open-loop or closed-loop intervention in relation to emissions and/or efficiency rating can be made.

This invention can help to counteract uncontrolled change in $NO_x$ emissions resulting from a change in exhaust backpressure, even before a change in $NO_x$ emissions occurs. Consequently, it is possible to comply with the $NO_x$ emission levels stipulated by law at all times.

This applies, in particular, to what is known as the $NO_x$ average value for the $NO_x$ proportion of exhaust gases at an outlet point on the internal combustion engine. This average $NO_x$ value for the $NO_x$ proportion of exhaust gases in most cases is a value stipulated by law with which the internal combustion engine is required to comply within a specified period of time.

This invention also enables an internal combustion engine to operate as close as possible to the stipulated $NO_x$ emission limits without having $NO_x$ closed-loop control reserves that compensate an unwanted intermediate increase in $NO_x$ emissions. Consequently, the internal combustion engine can also be operated at a higher power rating or at a higher efficiency rating.

Basically, in relation to the way fuel is delivered to at least one combustion chamber in the internal combustion engine, two types of procedures are known. The first type comprises air charged combustion engines with fuel delivery to individual cylinders (e.g., using port injection valves). The second type are mixture-charged combustion engines. This invention can be used for both types of internal combustion engines.

Advantageous embodiments of this invention are defined in the dependent claims.

Preferably it is provided that the open-loop or closed-loop control device is configured to change the bypass valve of the compressor when the bypass valve is adjusted, such that the $NO_x$ emissions can be maintained at a constant level.

It can be provided that the functional relationship takes account of an influence by an adjustment of the at least one actuator influencing the exhaust backpressure acting on at least one combustion chamber.

Preferably, it is provided that when the exhaust backpressure increases, due account is taken of the functional relationship in such way that the emission control loop sets a leaner fuel-air mixture compared to the previous operating point by changing the combustion parameter.

Making the fuel-air mixture more lean is a measure known by the prior art, during which the combustion air ratio increases. As is known, this can be achieved by reducing the delivery of fuel or by increasing the charge pressure or the delivery of air.

Preferably, it can be provided that when the exhaust backpressure increases, due account is taken of the functional relationship in such way that the emission control loop adjusts the ignition to a later time compared to the prior operating point by changing the combustion parameter.

Postponing the ignition time reduces the peak cylinder temperature, which in turn leads to a reduction in $NO_x$ emissions.

Preferably, it is provided that when the exhaust backpressure increases, due account is taken of the functional relationship in such way that the emission control loop sets a lower fill level relative to the previous operating point in at least one combustion chamber by changing the combustion parameter.

Of course, opposing measures can be taken if the exhaust backpressure decreases. Accordingly, by way of example, it is possible to take measures if exhaust backpressure reduces, for example, to maintain the $NO_x$ emission level as constant as possible at a given power rating.

It is known that the intake valves on an internal combustion engine should be closed before the piston in the engine air intake reaches its lower dead centre (early Miller process). In an alternative process, the intake valves in the compression cycle are closed once the cylinder reaches its maximum fill level (late Miller process). This can, for example, be facilitated by a variable valve drive that permits variable actuating characteristics on the intake valves.

An early Miller process with modified actuating characteristics for the intake valves in favor of a reduced fill level can result in the following outcomes:
  to achieve constant power, the energy introduced into the combustion chamber must be maintained at an almost constant level, which means that charge pressure must rise
  in response to expansion and/or the reduced effective compression, the cylinder charge temperature decreases at the time of ignition resulting in lower $NO_x$ emissions.

The Miller process for setting a fill level in at least one combustion chamber can, for example, be performed by a variable valve drive.

A variable valve drive is frequently used because this way an internal combustion engine can be operated at different operating points at the most favorable efficiency rating. It is also known for a variable valve drive to be used to control power, for example, by implementing operation without a throttle valve.

A change in the operating characteristics of an intake value causes a change in the delivery level (fill level) and therefore of the mass throughput of the internal combustion engine.

A power control loop is configured to match an actual power rating of an internal combustion engine to a target rating of that combustion engine.

Based on the assumption of constant power and constant $NO_x$ emissions, charge pressure must be increased for actuating characteristics with a lower fill level, but not so far that the same fuel-air ratio is established as there is a stronger cooling effect of the cylinder charge.

It is possible for the at least one combustion parameter that can be influenced by the open-loop or closed-loop control device to include a combustion air ratio. The combustion air ratio is also known by the synonyms of excess air coefficient, Lambda value or air ratio.

For influencing the combustion air ratio by the open-loop or closed-loop control device,
  a charge pressure setting,
  a fuel injection volume setting in at least one combustion chamber and/or
  a mix ratio setting for the fuel-air mixture (e.g. by a gas mixer) can be performed.

Preferably, it is provided that the at least one combustion parameter that can be influenced by the open-loop or closed-loop control device includes a charge pressure. A particular preference here is for the open-loop or closed-loop control device to establish a corresponding combustion air ratio by:
  setting an injection quantity for fuel in at last one combustion chamber and/or by
  setting a mix ratio for the fuel-air mixture when influencing the charge pressure.

It is possible for the at least one combustion parameter that can be influenced by the open-loop or closed-loop control device to include a time of ignition. This time of ignition can, for example, be moved by corresponding actuation of a spark plug.

Preferably, it can be provided that the open-loop or closed-loop control device is configured to actuate the actuator that influences the at least one combustion parameter to bring about a change in a fill level in the at least one combustion chamber, preferably by adjusting at least one variable valve drive.

It can be provided that the actuator that influences the at least one combustion parameter is designed as a throttle valve.

Preferably, the open-loop or closed-loop control device is designed to actuate the actuator that influences the at least one combustion parameter in order to bring about an adjustment of an amount of fuel directed to at least one combustion chamber and/or of an injection time for the fuel directed to at least one combustion chamber, preferably by actuating at least one port injection valve.

For example, it can be provided that the open-loop or closed-loop control device is designed to actuate the actuator that influences at least one combustion parameter in order to perform a setting of a charge pressure, preferably by adjusting a bypass valve for a compressor and/or a variable compressor geometry of at least one compressor. Bypass valves for a compressor are also known as compressor bypass valves.

It can be provided that the open-loop or closed-loop control device for determining a change of the exhaust backpressure acting on at least one combustion chamber takes account of an adjustment of at least one actuator that influences the exhaust backpressure acting on the at least one combustion chamber.

Preferably, it is provided that the at least one actuator that influences the exhaust backpressure acting on the combustion chamber includes a bypass valve for an exhaust turbine on a turbocharger. Bypass valves for an exhaust turbine of a turbocharger are also known as wastegates.

Preferably, it is provided that the at least one actuator that influences the exhaust backpressure acting on the one combustion chamber includes a variable turbine geometry appendant to an exhaust turbine.

It is possible for the at least one actuator that influences the exhaust backpressure acting on the combustion chamber to include a bypass valve for a catalytic converter arranged upstream of an exhaust turbine of a turbocharger.

Catalytic converters arranged before an exhaust turbine of a turbocharger of this kind are known by the prior art as PTCC converters (Pre-Turbo Charger Catalyst). In that respect, a catalytic converter is arranged between the at least one combustion chamber and the exhaust turbine of a turbocharger. In particular, regarding engines with large swept volume, this has the advantage of the possibility to improve the efficiency of the turbocharger, as the release of chemical energy that is stored after combustion in the at least one combustion chamber still in the form of the discharged material flow, causes the temperature of the material flow to increase and also to expand, resulting in a higher flow rate through the exhaust turbine of the turbocharger. The turbocharger compressor driven by the exhaust turbine can therefore deliver a higher charge pressure, which enables the internal combustion engine to achieve a higher overall power rating.

It can be provided that the open-loop or closed-loop control device for determining any change in the exhaust backpressure acting on the at least one combustion chamber takes account of a change of a measuring signal recorded by at least one sensor in an exhaust line of the internal combustion engine.

It can particularly be provided that the internal combustion engine is a stationary reciprocating piston engine operated by fuel gas and preferably drives a generator to generate electrical power.

Furthermore, patent protection is sought for a process for regulating or controlling an internal combustion engine, wherein in at least one combustion chamber of the internal combustion engine a fuel-air mixture with at least one combustion parameter that can be influenced is combusted, and wherein the at least one combustion parameter is closed loop or open loop controlled through at least one actuator that influences at least one combustion parameter as a substitute parameter for NOx emissions as part of an emission control loop by means of a functional relationship in such way that at least one combustion parameter is set for each target or actual power rating of the internal combustion engine, wherein the functional relationship defines the charge pressure based on the desired value for the power, the $NO_x$ emissions and a given level of exhaust backpressure, wherein by means of the functional relationship it is taken account of an influence of a change of the exhaust backpressure acting on at least one combustion chamber.

BRIEF DESCRIPTION OF THE DRAWINGS

Further advantages and details of this invention are provided in the Figures and the associated description of those Figures. In that respect, FIG. 3 shows a third embodiment of an internal combustion engine according to the invention, FIG. 4 shows a fourth embodiment of an internal combustion engine according to the invention.

DETAILED DESCRIPTION

Figure 1:
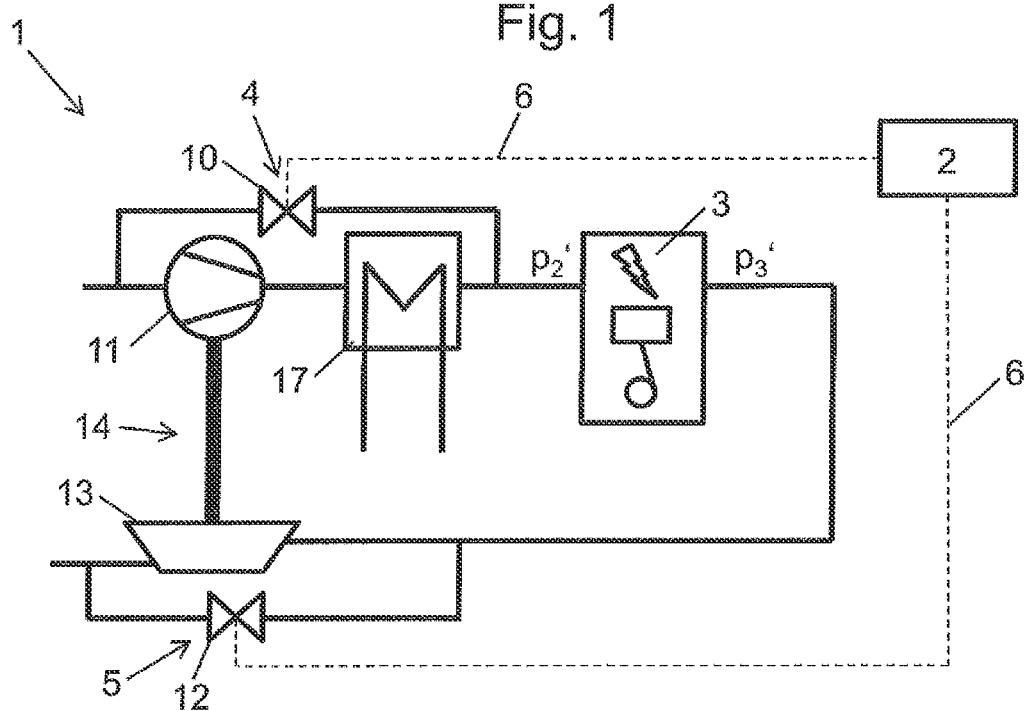
FIG. 1 shows a first embodiment of an internal combustion engine according to the invention.

FIG. 1 illustrates a first embodiment of an internal combustion engine 1 according to the invention. This internal combustion engine 1 has a combustion chamber 3 in which a fuel-air mixture is combusted. This invention is, of course, not restricted to a combustion chamber 3 and the combustion chamber 3 used in the Figures serves only as an example. The invention can be used on an internal combustion engine 1 for one or more combustion chambers 3 selectively and/or globally for all applications.

The fuel-air mixture is supplied to at least one combustion chamber 3 through a compressor 11 of a turbocharger 14, wherein the fuel-air mixture can be cooled after compression by the compressor 11 in a mixture cooler 17. The mixture cooler 17 and the compressor 11 can be bypassed by means of a bypass line with a bypass valve 10, wherein a charge pressure p2' can be adjusted by this bypass valve 10 and with that charge pressure p2' at least one combustion chamber 3 can be filled.

By changing the charge pressure $p_2'$, it is possible to vary the filling of at least one combustion chamber 3 when having constant valve opening times for the internal combustion engine 1.

In addition, the turbocharger 14 has an exhaust turbine 13 that can be bypassed by a bypass line along with the bypass valve 12. By means of this bypass valve 12, an exhaust backpressure $p_3'$ can be set which acts on the at least one combustion chamber 3.

An open-loop or closed-loop control device 2 is provided which is signal-conductively connected by means of signal conducting connections, on the one hand to the bypass valve 10 of the compressor 11 and on the other hand to the bypass valve 12 of the exhaust turbine 13. The bypass valve 10 of the compressor 11 (and also of the mixture cooler 17) in this embodiment is configured as an actuator 4 that influences combustion parameters. The bypass valve 12 of the exhaust turbine 13 in this embodiment forms the actuator 5 that influences the exhaust backpressure $p_3$.

The open-loop or closed-loop control device 2 is configured to actuate the at least one actuator 4 (in this embodiment, the bypass valve 10 of the compressor 11) that influences the at least one combustion parameter (in this embodiment, the charge pressure $p_2'$) as a substitute parameter for the NOx emission by means of a functional relationship in such way that at least one combustion parameter can be set for each target power or actual power rating of the internal combustion engine 1, wherein the functional relationship takes account of an influence of an adjustment of the at least one actuator 5 (in this embodiment, the bypass valve 12 of the exhaust turbine 13) that influences the exhaust backpressure p3' acting on the at least one combustion chamber 3.

In other words, the open-loop or closed-loop control device is configured to change the bypass valve 10 of the compressor 11 when the bypass valve 12 is adjusted such that the $NO_x$ emissions can be maintained at a constant level, because any change of the position of the bypass valve 12 of exhaust turbine 13 has a direct influence on the exhaust backpressure $p_3'$ (which acts on at least one combustion chamber 3) and therefore affects the $NO_x$ production in the at least one combustion chamber 3 (through a modified efficiency rating and modified residual gas components and temperatures). However, the $NO_x$ emissions can be maintained at a constant level by adapting the charge pressure $p_2'$ through the bypass valve 10 of the compressor 11.

By means of the functional relationship saved in the open-loop or closed-loop control unit 2, the charge pressure $p_2'$ can be determined based on the desired value for the power $P_{mech}$, the $NO_x$ emissions and a given level of exhaust backpressure $p_3'$. Specific details regarding this functional relationship will be explained at a later point (see FIG. 9).

Figure 2:
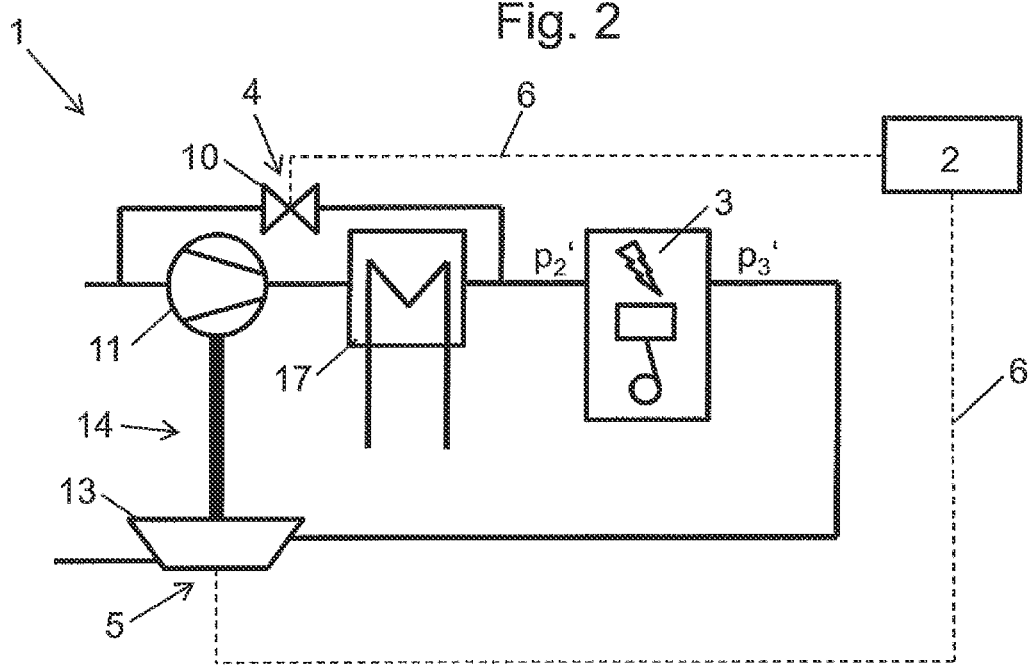
FIG. 2 shows a second embodiment of an internal combustion engine according to the invention.

FIG. 2 shows a similar embodiment, but in this second embodiment of the internal combustion engine 1, the actuator 5 that affects the exhaust backpressure $p_3'$ is the variable turbine geometry of the exhaust turbine 13 of the turbocharger 14. By adjusting this variable turbine geometry, a change of the exhaust backpressure $p_3'$ that acts on the at least one combustion chamber 3 is effected with which the bypass valve 10 of the compressor 11 is adjustable by means of the open-loop or closed-loop control device 2 on and the charge pressure $p_2'$ is configurable by means of a functional relationship in order to maintain $NO_x$ emissions at a constant level.

In the embodiment shown in FIG. 3, a catalytic converter 16 is provided between the at least one combustion chamber 3 and exhaust turbine 13. Catalytic converters 16 of this kind are also known by the synonym PTCC converters and are used to release chemical energy in the flow of exhaust emissions, causing the exhaust temperature to increase leading to an explosion of exhaust gas, which in turn enables the material flow acting on the exhaust turbine 13 to increase with which the efficiency of the turbocharger 14 is improved. In order to open or closed loop control this process, a bypass valve 15 is provided on catalytic converter 16 and that bypass valve 15 has a signal-conducting connection 6 to the open-loop or closed-loop control unit 2.

The bypass valve 15 of the catalytic converter 16 is an actuator 5 that influences the exhaust backpressure $p_3'$ by means of which in turn the bypass valve 10 of the compressor 11—when changing the position of the actuator 5 (of the bypass valve 15 of the catalytic converter 16) that influences the exhaust backpressure p3'—is actuated via the functional relationship in such way that a charge pressure p2' is corrected accordingly to obtain the most constant NOx emission value possible.

The embodiment in FIG. 4 shows an internal combustion engine 1 that is similar to the embodiment in FIG. 1. However, in this embodiment, a throttle valve 8 is used as actuator 4 that influences the combustion parameter, which in turn can also influence the fill level of the at least one combustion chamber 3.

Figure 5:
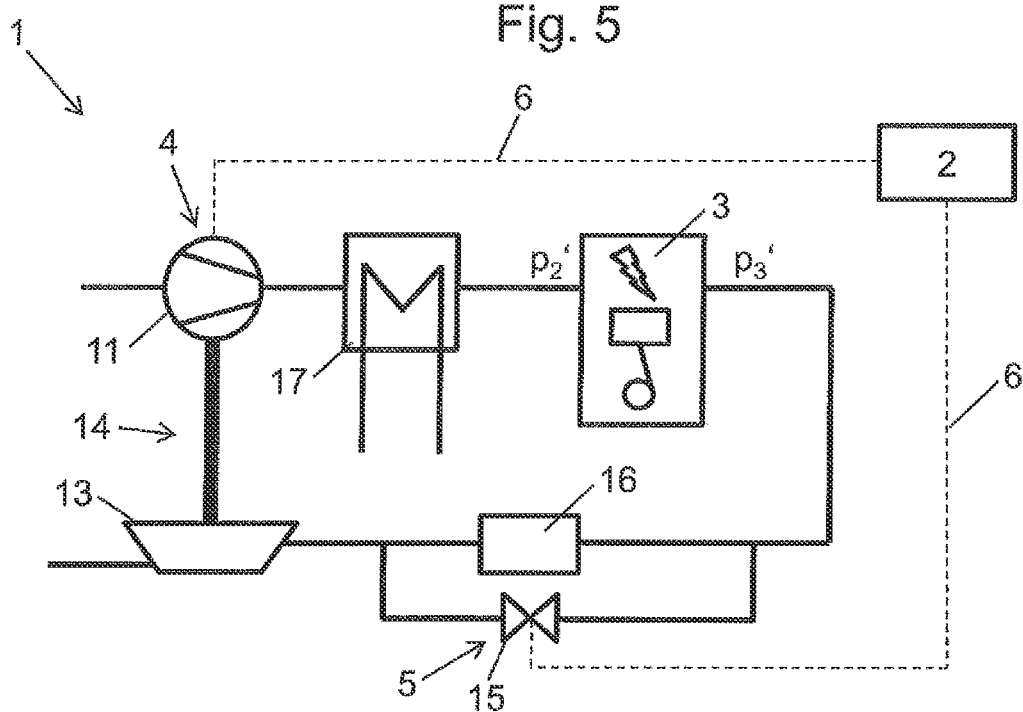
FIG. 5 shows a fifth embodiment of an internal combustion engine according to the invention.

Then again, the embodiment in FIG. 5 illustrates a similar embodiment to the one in FIG. 3, but here the internal combustion engine 1 of the embodiment in FIG. 5 has a compressor 11 with a variable compressor geometry, wherein the compressor geometry and/or the adjusting unit of the compressor geometry is signal-conductively connected to the open-loop or closed-loop control unit 2 by means of a signal conducting connection 6 and the open-loop or closed-loop control unit 2 uses the variable compressor geometry of the compressor 11 as an actuator 4 for setting a combustion parameter (or more accurately, the charge pressure $p_2'$).

Figure 6:
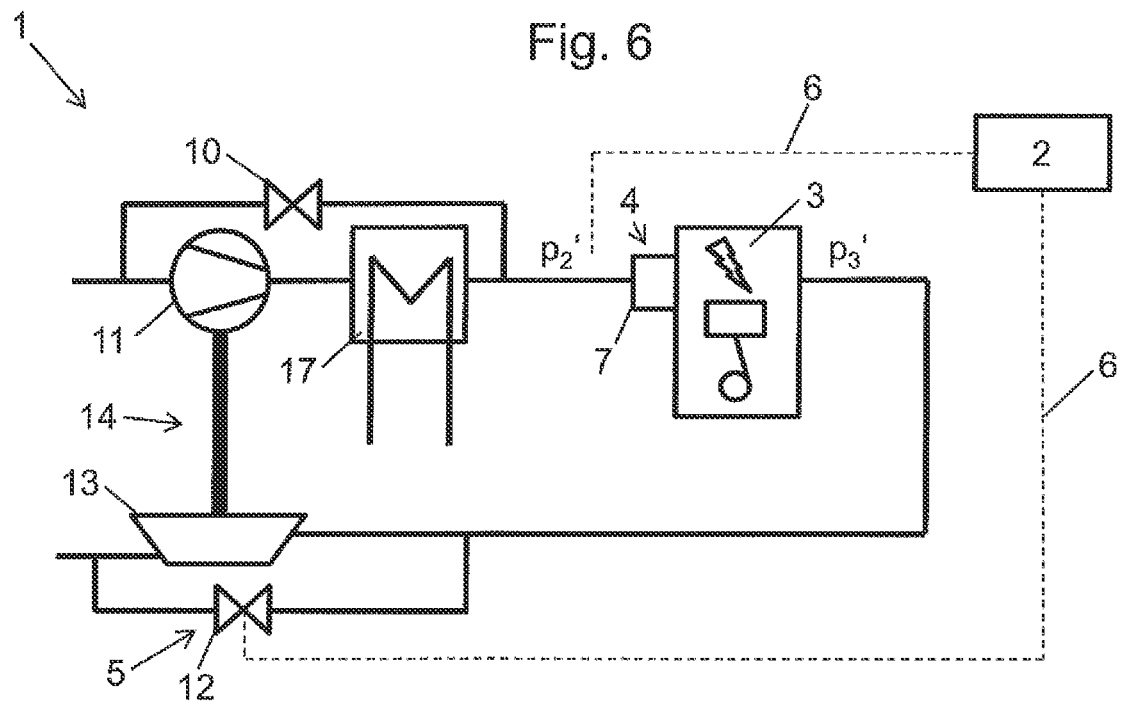
FIG. 6 shows a sixth embodiment of an internal combustion engine according to the invention.

The embodiment in FIG. 6 shows a similar embodiment to the one in FIG. 1, although the internal combustion engine 1 of the embodiment in FIG. 6 has a variable valve drive 7 that can be used to set the fill level of at least one combustion chamber 3 (for example, in accordance with an early or late Miller process). In turn, this variable valve drive 7 is connected to the open-loop or closed-loop control unit 2 by means of a signal-conducting connection 6, wherein the variable valve drive 7 as actuator 4 that affects the combustion parameter is closed loop or open loop controlled by means of the open-loop or closed-loop control unit 2.

Figure 7:
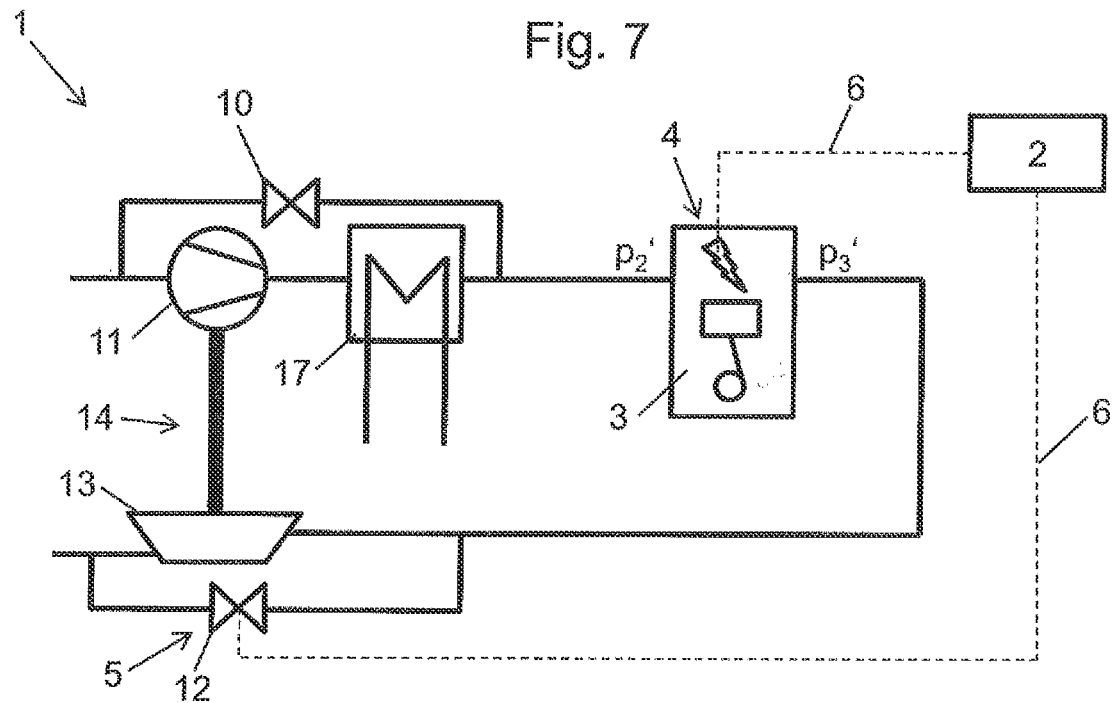
FIG. 7 shows a seventh embodiment of an internal combustion engine according to the invention.

The embodiment in FIG. 7 of an internal combustion engine 1 is also similar, but in the embodiment of FIG. 7 the actuation of an ignition device is used as the actuator 4 that influences the combustion parameter by means of such said actuation of an ignition device an ignition time for the combustion can be open-loop or closed-loop controlled. This happens by having the open-loop or closed-loop control unit 2 connected to the ignition unit of the at least one combustion chamber 3 by a signal-conducting connection 6.

Figure 8:
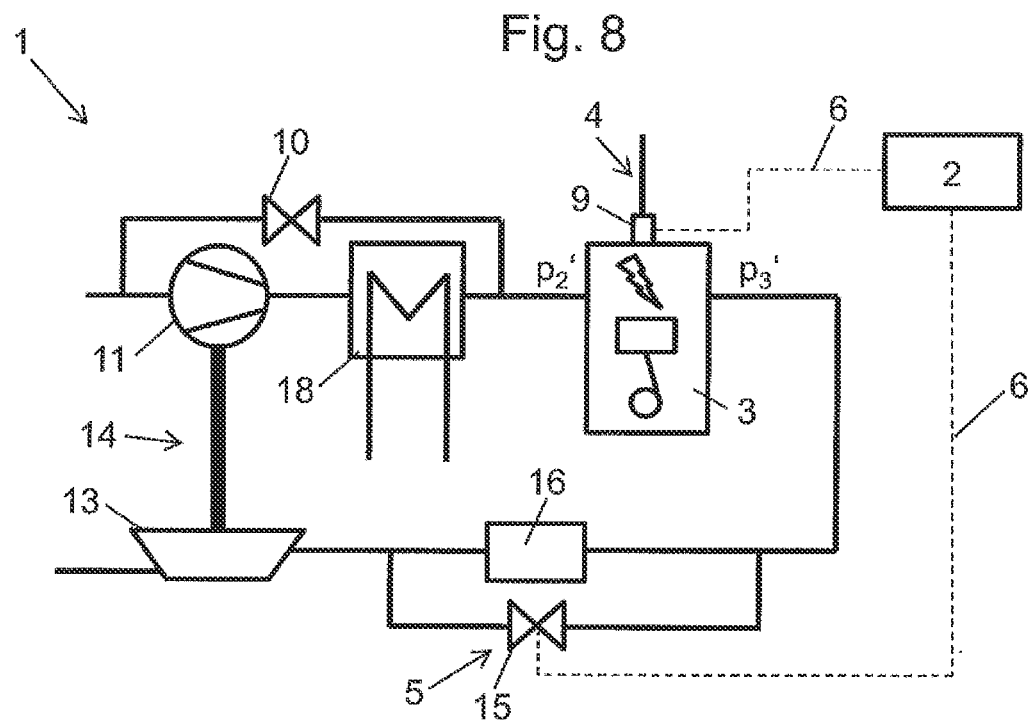
FIG. 8 shows an eighth embodiment of an internal combustion engine according to the invention and FIG. 9 shows a diagram of charge pressure over power for different exhaust backpressures.

The embodiment in FIG. 8 shows an internal combustion engine 1 that has an injection unit separated from the air intake for delivering fuel into at least one combustion chamber 3. This fuel injection unit for delivering fuel into at least one combustion chamber 3 is designed as a port injection valve 9.

Air is supplied via a compressor 11 of a turbocharger 14, wherein the compressed air is cooled before entering the at least one combustion chamber 3 by means of an intercooler 18. To be able to vary the charge pressure $p_2'$, a bypass line with a bypass valve 10 for the compressor 11 is provided.

As already described in the preceding Figures, in the exhaust line an exhaust turbine 13 is provided and a catalytic converter 16 that is arranged between the exhaust turbine 13 and the at least one combustion chamber 3, and said catalytic converter 16 can be bypassed by a bypass line with a bypass valve 15 of the catalytic converter 16.

The open-loop or closed-loop control unit 2 is connected by signal conducting connections to an actuator 4 that influences combustion parameters and to an actuator 5 that influences the exhaust backpressure $p_3'$.

The actuator 4 that influences combustion parameters in this embodiment is configured as port injection valve 9 by actuation of which can the combustion air ratio λ in the at least one combustion chamber 3 can be influenced. In this embodiment, the actuator 5 that affects exhaust backpressure $p_3'$ is configured as bypass valve 15 of the catalytic converter 16.

Figure 9:
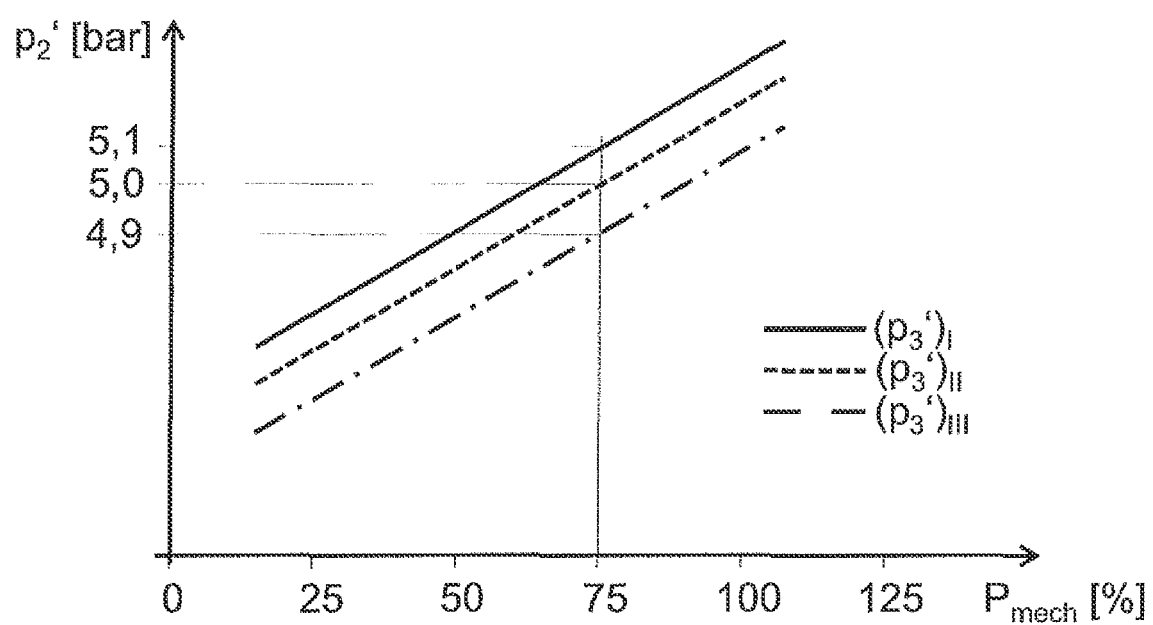

FIG. 9 shows a diagram of the charge pressure $p_2'$ of an internal combustion engine 1 illustrating the mechanical power $P_{mech}$ performed by the internal combustion engine 1. Shown here is the relationship regarding three different exhaust backpressures $p_3'$ at a specified level of $NO_x$ emissions—i.e., identical on all three curves.

This diagram shows the mechanical power $P_{mech}$ of the internal combustion engine 1 with the charge pressure $p_2'$ in context, wherein a curve is provided for each $NO_x$ target value (constant in the diagram shown here) and for each exhaust backpressure $p_3'$. This set of curves forms the functional relationship.

To achieve a constant $NO_x$ emission level when changing the exhaust backpressure $p_3'$ (for example, by changing actuator 5 that influences the exhaust backpressure $p_3'$), a corresponding charge pressure $p_2'$ must be selected to be able to maintain a constant mechanical power $P_{mech}$ of the internal combustion engine 1 of 75%. This functional relationship is to be used by the open-loop or closed-loop control unit 2 when regulating or controlling the internal combustion engine 1.

LIST OF REFERENCES

1 Combustion engine
2 Open-loop or closed-loop control device
3 Combustion chamber
4 Actuator that influences combustion parameters
5 Actuator that influences exhaust backpressure
6 Signal conducting connection
7 Variable valve drive
8 Throttle valve
9 Port injection valve
10 Compressor bypass valve
11 Compressor
12 Exhaust turbine bypass valve
13 Exhaust turbine
14 Turbocharger
15 Catalytic converter bypass valve
16 Catalytic converter
17 Mixture cooler
18 Intercooler
$p_2'$ Charge pressure
$P_3'$ Exhaust backpressure
λ Compression air ratio
$P_{mech}$ Mechanical power

The invention claimed is:

1. An internal combustion engine designed to burn a fuel-air mixture in at least one combustion chamber, wherein the internal combustion engine comprises:
   an open-loop or closed-loop controller, wherein the open-loop or closed-loop controller is configured to:
   influence at least one combustion parameter of the internal combustion engine; and
   actuate, via an emission control loop, at least one actuator that influences the at least one combustion parameter as a substitute parameter for $NO_x$ emissions by a functional relationship in such way that the at least one combustion parameter can be set for each target or actual power rating of the internal combustion engine;
   wherein the functional relationship defines a charge pressure ($p_2'$) based on a desired value for a power ($P_{mech}$), the $NO_x$ emissions and a given level of an exhaust backpressure ($p_3'$) and is saved in the open-loop or closed-loop controller;
   wherein the functional relationship takes account of an influence of a change of the exhaust backpressure ($p_3'$) affecting the at least one combustion chamber.

2. The internal combustion engine according to claim 1, wherein, when the exhaust backpressure ($p_3'$) increases, due account is taken of the functional relationship in such way that the emission control loop sets a leaner fuel-air mixture compared to a previous operating point by changing the at least one combustion parameter.

3. The internal combustion engine according to claim 1, wherein, when the exhaust backpressure ($p_3'$) increases, due account is taken of the functional relationship in such way that the emission control loop adjusts a time of ignition to a later time compared to a previous operating point by changing the at least one combustion parameter.

4. The internal combustion engine according to claim 1, wherein, when the exhaust backpressure ($p_3'$) increases, due account is taken of the functional relationship in such way that the emission control loop sets a lower fill level relative to a previous operating point in the at least one combustion chamber by changing the at least one combustion parameter.

5. The internal combustion engine according to claim 1, wherein the at least one combustion parameter that can be influenced by the open-loop or closed-loop controller includes a time of ignition.

6. The internal combustion engine according to claim 1, wherein the open-loop or closed-loop controller is configured to actuate the at least one actuator that influences the at least one combustion parameter to bring about a change in a fill level in the at least one combustion chamber by adjusting at least one variable valve drive.

7. The internal combustion engine according to claim 1, wherein the at least one actuator that can influence the at least one combustion parameter comprises a throttle valve.

8. The internal combustion engine according to claim 1, wherein the open-loop or closed-loop controller is designed to actuate the at least one actuator that can influence the at least one combustion parameter in order to bring about an adjustment of an amount of fuel directed to the at least one combustion chamber and/or of an injection time for the fuel directed to the at least one combustion chamber by actuating at least one port injection valve.

9. The internal combustion engine according to claim 1, wherein the open-loop or closed-loop controller is designed to actuate the at least one actuator that influences the at least one combustion parameter in order to perform a setting of the charge pressure ($p_2'$) by adjusting a bypass valve for a compressor and/or a variable compressor geometry of the compressor.

10. The internal combustion engine according to claim 1, wherein the open-loop or closed-loop controller for determining any change of the exhaust backpressure ($p_3'$) acting on the at least one combustion chamber, takes account of a change of a measuring signal recorded by at least one sensor in an exhaust line of the internal combustion engine.

11. The internal combustion engine according to claim 1, wherein the open-loop or closed-loop controller is configured to change a bypass valve of a compressor when the bypass valve is adjusted such that the $NO_x$ emissions can be maintained at a constant level.

12. The internal combustion engine according to claim 1, wherein the at least one combustion parameter that can be influenced by the open-loop or closed-loop controller comprises a combustion air ratio ($\lambda$).

13. The internal combustion engine according to claim 12, wherein the open-loop or closed-loop controller affects the combustion air ratio ($\lambda$) by at least one of:
   setting the charge pressure ($p_2'$);
   setting an injection volume for fuel in the at least one combustion chamber; and/or
   setting a mix ratio for the fuel-air mixture.

14. The internal combustion engine according to claim 1, wherein the at least one combustion parameter that can be influenced by the open-loop or closed-loop controller comprises the charge pressure ($p_2'$).

15. The internal combustion engine according to the claim 14, wherein, when influencing the charge pressure ($p_2'$), the open-loop or closed-loop controller open loop or closed loop controls a corresponding combustion air ratio ($\lambda$) by at least one of:
   setting an injection volume for fuel in the at least one combustion chamber; and/or
   setting a mix ratio for the fuel-air mixture.

16. The internal combustion engine according to claim 1, wherein the open-loop or closed-loop controller for determining a change of the exhaust backpressure ($p_3'$) acting on the at least one combustion chamber takes account of an adjustment of the at least one actuator that affects the exhaust backpressure ($p_3'$) acting on the at least one combustion chamber.

17. The internal combustion engine according to claim 16, wherein the at least one actuator that influences the exhaust backpressure ($p_3'$) acting on the at least one combustion chamber includes a bypass valve for an exhaust turbine of a turbocharger.

18. The internal combustion engine according to claim 16, wherein the at least one actuator that influences the exhaust backpressure ($p_3'$) to the at least one combustion chamber includes a variable turbine geometry for an exhaust turbine of a turbocharger.

19. The internal combustion engine according to claim 16, wherein the at least one actuator that influences the exhaust backpressure ($p_3'$) acting on the at least one combustion chamber includes a bypass valve for a catalytic converter arranged upstream of an exhaust turbine of a turbocharger.

20. A process for regulating or controlling an internal combustion engine, comprising:
   combusting a fuel-air mixture in at least one combustion chamber of the internal combustion engine, wherein at least one combustion parameter of the fuel-air mixture can be influenced; and
   open loop or closed loop controlling the at least one combustion parameter through at least one actuator that influences the at least one combustion parameter as a substitute parameter for $NO_x$ emissions as part of an emission control loop by a functional relationship in such way that at least one combustion parameter is set for each target or actual power rating of the internal combustion engine, wherein the functional relationship defines a charge pressure ($p_2'$) based on a desired value for a power ($P_{mech}$), the $NO_x$ emissions and a given level of an exhaust backpressure ($p_3'$), wherein by the functional relationship it is taken account of an influence of a change of the exhaust backpressure ($p_3'$) acting on the at least one combustion chamber.

\* \* \* \* \*